United States Patent
Huang

(10) Patent No.: US 8,471,427 B2
(45) Date of Patent: Jun. 25, 2013

(54) MOTOR MAGNETIC POLE ASSEMBLY AND MOTOR MANUFACTURING METHOD USING THE SAME

(75) Inventor: Chiang-Cheng Huang, Taipei (TW)

(73) Assignee: Risun Expanse Corp., Taipei (TW)

( * ) Notice: Subject to any disclaimer, the term of this patent is extended or adjusted under 35 U.S.C. 154(b) by 348 days.

(21) Appl. No.: 12/878,255

(22) Filed: Sep. 9, 2010

(65) Prior Publication Data

US 2012/0062063 A1 Mar. 15, 2012

(51) Int. Cl.
*H02K 1/00* (2006.01)
(52) U.S. Cl.
USPC ..................... 310/194; 310/216.074
(58) Field of Classification Search
USPC ............... 310/194, 195, 71, 43, 215, 216.04, 310/216.074; 336/192, 198
IPC ...................................................... H02K 23/40
See application file for complete search history.

(56) References Cited

U.S. PATENT DOCUMENTS

| | | | |
|---|---|---|---|
| 3,585,450 A * | 6/1971 | Lane | 361/41 |
| 4,114,056 A * | 9/1978 | Nimura | 310/71 |
| 5,539,265 A * | 7/1996 | Harris et al. | 310/263 |
| 5,898,252 A * | 4/1999 | Tanaka et al. | 310/214 |
| 6,462,443 B2 * | 10/2002 | Horng | 310/68 B |
| 6,577,031 B2 * | 6/2003 | Morooka et al. | 310/68 R |
| 6,897,592 B2 * | 5/2005 | Suzuki et al. | 310/194 |
| 6,975,056 B2 * | 12/2005 | Okada et al. | 310/194 |
| 7,663,284 B2 * | 2/2010 | Ke et al. | 310/194 |
| 2004/0155542 A1 * | 8/2004 | Matsuura et al. | 310/71 |
| 2004/0174087 A1 * | 9/2004 | Heidrich | 310/218 |
| 2008/0252181 A1 * | 10/2008 | Suzuki et al. | 310/49 R |
| 2009/0230810 A1 * | 9/2009 | Sugiura et al. | 310/215 |

FOREIGN PATENT DOCUMENTS

| | | |
|---|---|---|
| CN | 2307392 Y | 2/1999 |
| CN | 1388622 A | 1/2003 |

OTHER PUBLICATIONS

State Intellectual Property Office of the People's Republic of China, "Office Action", Oct. 22, 2012, China.

* cited by examiner

*Primary Examiner* — Thanh Lam
(74) *Attorney, Agent, or Firm* — Morris Manning & Martin LLP; Tim Tingkang Xia, Esq.

(57) ABSTRACT

A motor magnetic pole assembly includes a coil body, a base, and two conductive portions. The coil body has a central shaft in a center and connection ends at two ends respectively. The base includes a column and a first plate body, the coil body surrounds the column, and the central shaft is parallel with the column. The two conductive portions are respectively arranged on a surface of the first plate body and are spaced by a distance, and the two connection ends are electrically connected to the two conductive portions respectively. The base may further include a second plate body, such that the first plate body, the column and the second plate body form an H shape. Therefore, the motor magnetic pole assembly may be precisely and quickly placed on a circuit board through an automation process, thereby increasing a processing speed of a production line.

4 Claims, 6 Drawing Sheets

MOTOR MAGNETIC POLE ASSEMBLY AND MOTOR MANUFACTURING METHOD USING THE SAME

BACKGROUND OF THE INVENTION

1. Field of the Invention

The present invention relates to a motor magnetic pole assembly and a motor manufacturing method using the same, and more particularly to a motor magnetic pole assembly that is able to be assembled on a circuit board through an automatic jig and a motor manufacturing method using the same.

2. Related Art

Recently, with rapid growth of the science industry, demands of consumers for electronic products increase accordingly, such that the electronic products enter an era of being light, thin, short, small, and easily portable. However, various electronic elements, for example, a central processing unit and a power supplier, are disposed in the electronic product. During the operation of the electronic elements, the electronic elements generate a great amount of heat, such that a cooling fan has to be installed to eliminate the heat, so as to prevent the electronic element from reaching an excessively high temperature to reduce a useful life of the electronic element. The size of the cooling fan also becomes smaller with the miniaturization of the electronic product.

FIG. 1 is an exploded view of a mini cooling fan in the prior art. The mini cooling fan 100 comprises a base frame 102, a stator set 104, a rotor set 106, a rotating shaft 108, and a positioning member 110. The stator set 104 is disposed on the base frame 102. Two opposite ends of the rotating shaft 108 are respectively combined with the rotor set 106 and the stator set 104, and protrude out of a top surface of the rotor set 106 and the base frame 102. The positioning member 110 is combined with the base frame 102. The stator set 104 comprises coils 112. A size of the mini cooling fan 100 is that a length is approximately 1.5 cm (centimeter), a width is approximately 1.5 cm, and a height is approximately 4 mm (millimeter), such that it may be known that the coils 112 in the stator set 104 are also very tiny according to the size of the mini cooling fan 100.

However, in the conventional miniaturized fan, the coil of the stator set is assembled by manual aligning and soldering, that is, the tiny coil is manually held, manually aligned, and manually soldered in a limited space of the electronic product. For the method performed by the manual assembling and soldering, in one aspect, the method is performed in the limited space of the electronic product, resulting in a slow processing speed, in another aspect, the method is performed in the manual mode, such that the quality of the processed product cannot be ensured. And in yet another aspect, the method costs much manpower, thereby increasing manufacturing cost.

SUMMARY OF THE INVENTION

In view of the above problems, the present invention is a motor magnetic pole assembly, capable of being placed on a circuit board through an automatic jig, so as to increase a processing speed of a production line, thereby overcoming problems that a conventional coil cannot be automatically assembled and a manufacturing cost of an electronic product is excessively high.

In an embodiment, the present invention provides a motor magnetic pole assembly, which comprises a coil body, a base, and two conductive portions. The coil body has a central shaft and two connection ends. The base comprises a column and a first plate body. The coil body surrounds the column and the central shaft is in parallel with the column. The two conductive portions are respectively arranged on a surface of the first plate body opposite to the column and are spaced by a distance, thereby avoiding direct contact with each other, so as to prevent the circuit from short circuit and damages. The connection ends are respectively electrically connected to the conductive portions. The base further comprises a second plate body having a first groove, so as to differentiate whether the coil body surrounds the column clockwise or counterclockwise. The first plate body, the column and the second plate body form an H shape.

In an embodiment, the present invention further provides a motor manufacturing method using a motor magnetic pole assembly, which comprises the following steps. A circuit board which is inside a motor is provided, which at least has two connection ends. A motor magnetic pole assembly is provided, which at least has two conductive portions. The motor magnetic pole assembly is arranged on the circuit board which is inside the motor through an automation process, and the two connection ends are respectively aligned with the two conductive portions. The motor magnetic pole assembly is electrically connected to the circuit board which is inside the motor through a surface mounted process. In the automation process, the motor magnetic pole assembly is arranged on the circuit board on which the motor is mounted via vacuum adsorption or magnetic attraction.

In the motor magnetic pole assembly according to the present invention, through the motor magnetic pole assembly having the H shape base, mass automation production can be realized when the motor magnetic pole assembly is applied to manufacture the motor. The motor magnetic pole assembly is a revolutionary evolution of motor components. Through the motor manufacturing method using the motor magnetic pole assembly according to the present invention, an era of manpower intensive process and assembly that does not satisfy market demands is evolved to an era of electronic mechanization mass production. In the era of electronic mechanization mass production, in one aspect, manpower consumption may be reduced, so as to reduce the manufacturing cost of the motor. In another aspect, the manufacturing quality of the motor may be improved and maintained due to mechanization control. In yet another aspect, the production performance of the production line may be improved.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
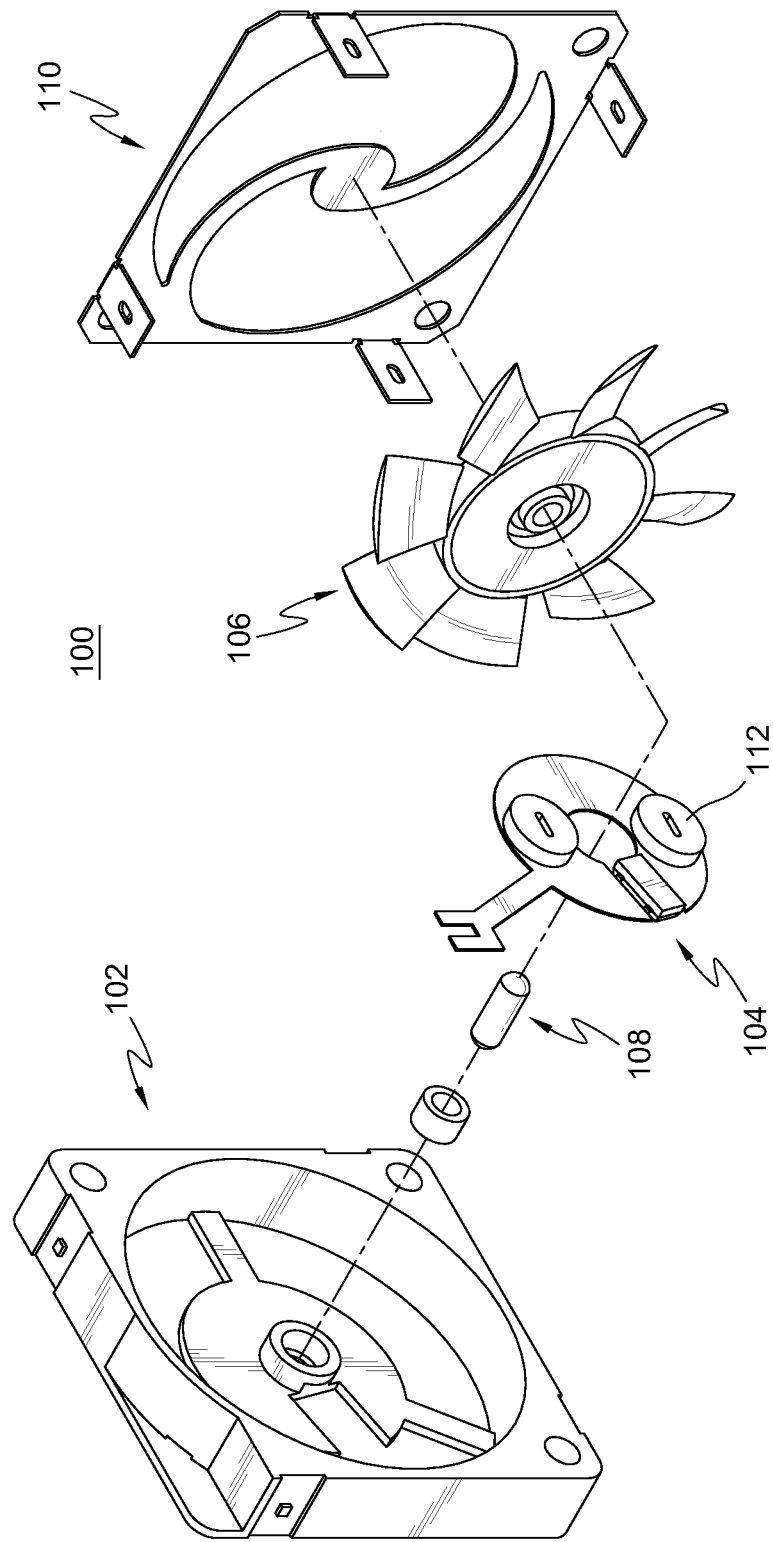
FIG. 1 is an exploded view of a mini cooling fan in the prior art.
Figure 2B:
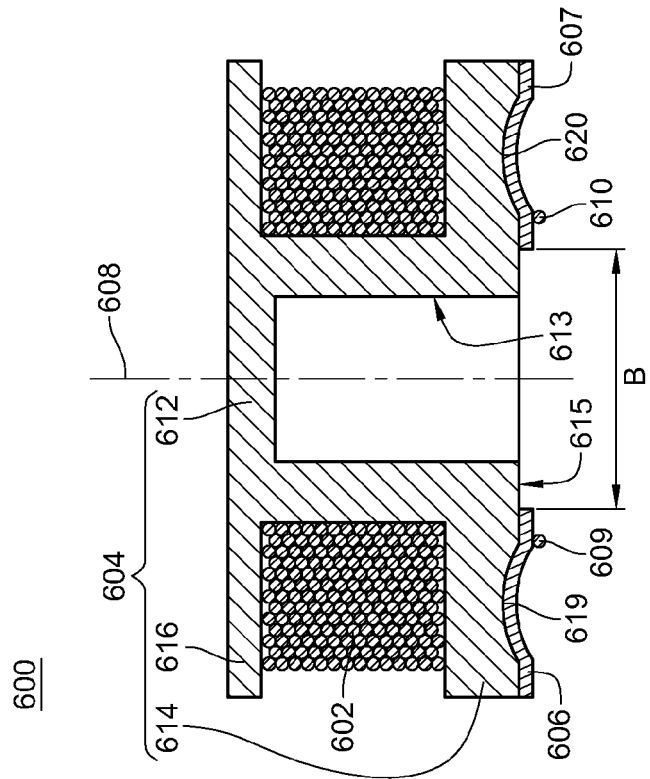
FIG. 2B is a schematic sectional structural view of a motor magnetic pole assembly according to an embodiment of the present invention.
Figure 2A:
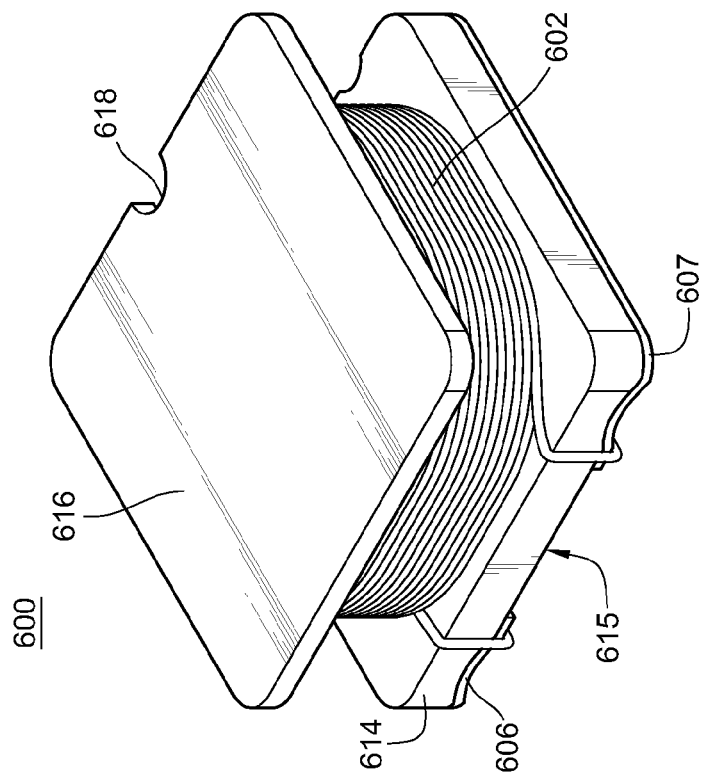
FIG. 2A is a 3D schematic structural view of a motor magnetic pole assembly according to an embodiment of the present invention.

FIGS. 2A and 2B are respectively a schematic 3D structural view and a schematic sectional structural view of a motor magnetic pole assembly according to an embodiment of the present invention. A motor magnetic pole assembly 600 comprises a coil body 602, a base 604, and conductive portions 606 and 607. The coil body 602 has a central shaft 608 and connection ends 609 and 610. The base 604 comprises a column 612 and a first plate body 614. The coil body 602 surrounds the column 612 and the central shaft 608 is in parallel with the column 612. The conductive portions 606 and 607 are respectively arranged on a surface 615 of the first plate body 614 opposite to the column 612 and are spaced by a distance B, thereby avoiding direct contact with each other, so as to prevent the circuit from short circuit and damages. The connection ends 609 and 610 are respectively electrically connected to the conductive portions 606 and 607. The column 612 may be, but not limited to, a cylinder. For example, the column 612 may also be a square column, an elliptical cylinder or a triangular column.

Figure 2C:
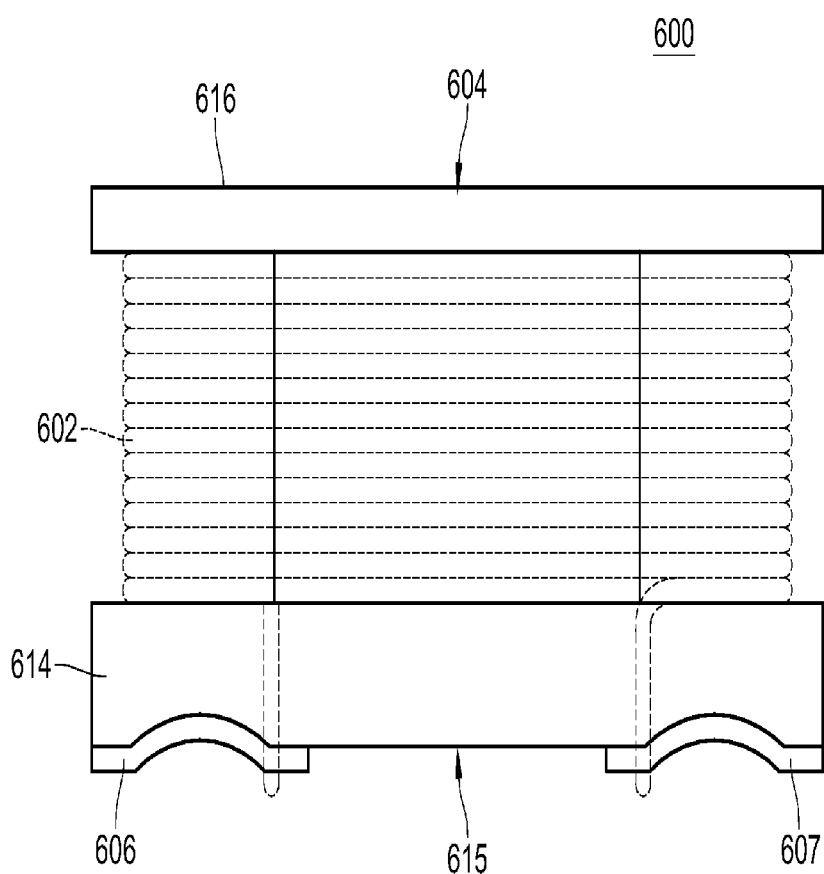
FIG. 2C is a schematic side view of a motor magnetic pole assembly of FIG. 2A, where a coil body is shown in broken lines.

As shown in FIGS. 2A, 2B and 2C, the base 604 further comprises a second plate body 616, such that the first plate body 614, the column 612 and the second plate body 616 form an H shape. The second plate body 616 has a first groove 618, which is used for representing whether the coil body 602 surrounds the column 612 clockwise or counterclockwise. In this embodiment, the second plate body 616 having the first groove 618 may represent that the coil body 602 surrounds the column 612 clockwise, and when the conductive portions 606 and 607 obtain a power source, the second plate body 616 forms a south pole. However, the present invention is not limited to this embodiment. A material of the base 604 may be, but not limited to, plastics, ceramics, or iron oxide.

The base 604 further comprises a notch 613 which is arranged between the conductive portions 606 and 607, penetrating the column 612 and the first plate body 614, and used for dissipating heat generated during the operation of the motor magnetic pole assembly 600. The first plate body 614 respectively has second grooves 619 and 620 where the conductive portions 606 and 607 are arranged, and a width and a length of the second grooves 619 and 620 are smaller than a width and a length of the conductive portions 606 and 607. More particularly, parts of the conductive portions 606 and 607 are distributed on surfaces of the second grooves 619 and 620, and the connection ends 609 and 610 are not arranged in the second grooves 619 and 620. The second grooves 619 and 620 may be wiring spaces of a circuit board arranged by the motor magnetic pole assembly 600. However, the present invention is not limited to this embodiment.

Figure 3A:
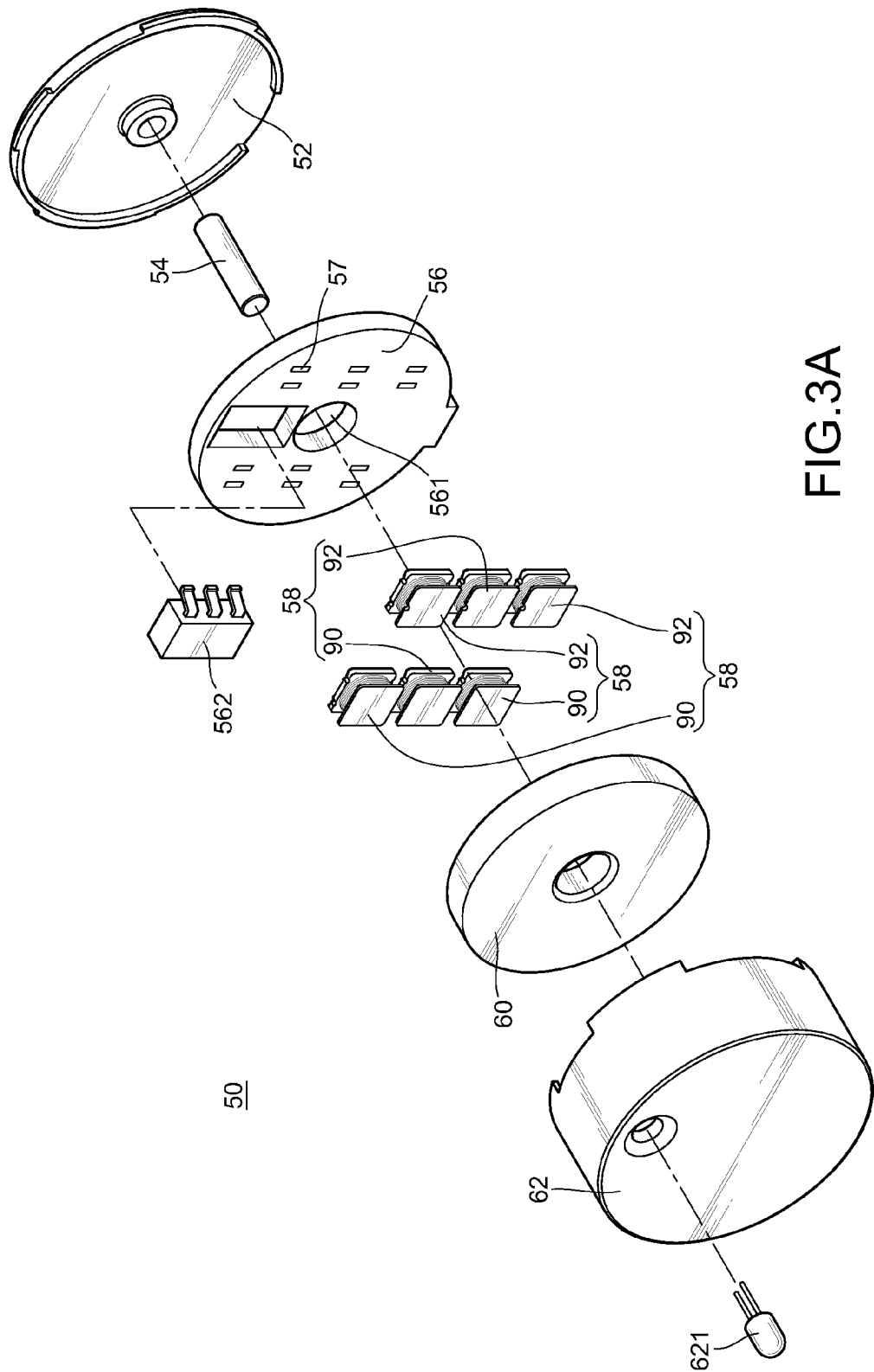
FIG. 3A is a schematic exploded structural view of a motor manufacturing method using a motor magnetic pole assembly according to the present invention.
Figure 3B:
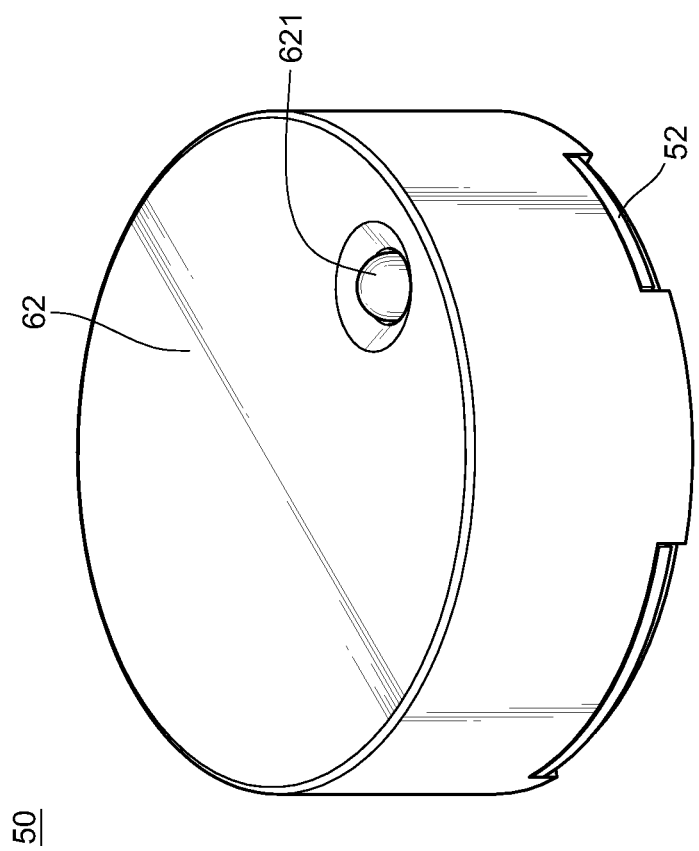
FIG. 3B is a schematic combined structural view of a motor manufacturing method using a motor magnetic pole assembly according to the present invention.
Figure 3C:
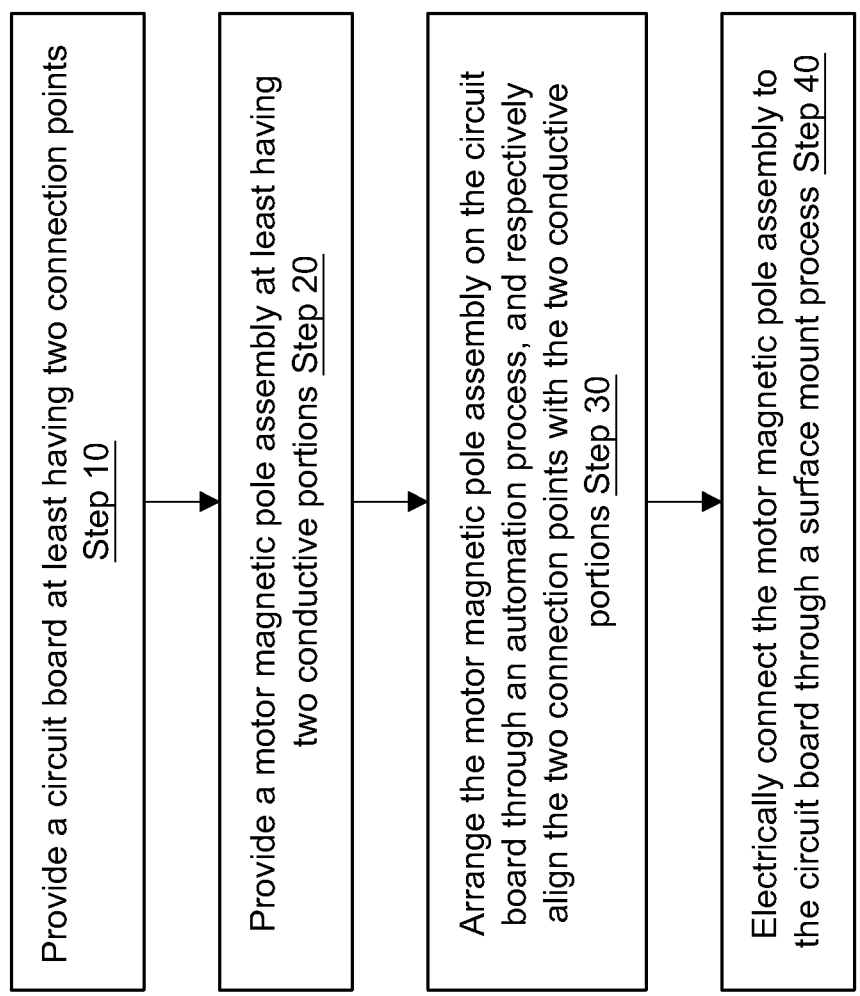
FIG. 3C is a schematic flow chart of a motor manufacturing method using a motor magnetic pole assembly according to the present invention.

A size of the motor magnetic pole assembly according to the present invention may be, but not limited to, that a length is 2 mm, a width is 2 mm, and a height is 1.5 mm. The motor magnetic pole assembly with the size according to the present invention is applicable to various miniaturized electronic products, which may be, for example, but not limited to, a brushless direct current (DC) motor and a cooling fan. FIGS. 3A, 3B, and 3C are respectively a schematic exploded structural view, a schematic combined structural view, and a schematic flow chart of a motor manufacturing method using a motor magnetic pole assembly according to an embodiment of the present invention. In this embodiment, a motor may be, but not limited to, a DC brushless motor 50. The DC brushless motor 50 comprises a base 52, an axle center 54, a circuit board 56, three winding sets 58, a rotating element 60, and a housing 62.

The housing 62 has a light emitting diode (LED) 621 electrically connected to the circuit board 56. The housing 62 may be combined with the base 52, and an accommodation space formed by the housing 62 and the base 52 may accommodate the axle center 54, the circuit board 56, the three winding sets 58, and the rotating element 60. The circuit board 56 may be round, a perforation 561 is disposed at a center of the circuit board 56 to be sleeved on the axle center 54, and the circuit board 56 has a controller 562. Each winding set 58 comprises a motor magnetic pole assembly 90 having a coil body wound with wires clockwise and a motor magnetic pole assembly 92 having a coil body wound with wires counterclockwise. Each motor magnetic pole assembly 90 and each motor magnetic pole assembly 92 are symmetrically disposed on the circuit board 56 by using the perforation 561 as a symmetrical axis.

The motor (that is, the DC brushless motor 50) manufacturing method using the motor magnetic pole assembly comprises the following steps. The circuit board 56 is provided, which at least has two connection ends 57 (Step 10). The motor magnetic pole assembly is provided, which at least has two conductive portions (not shown) (Step 20). The motor magnetic pole assembly is arranged on the circuit board 56 through an automation process, and the two connection ends 57 are respectively aligned with the two conductive portions (Step 30). The motor magnetic pole assembly is electrically connected to the circuit board 56 through a surface mounted process (Step 40). In this embodiment, the circuit board 56 may have, but not limited to, the two connection ends 57, and the motor magnetic pole assembly may have, but not limited to, the two conductive portions. The automation process may be, but not limited to, that the motor magnetic pole assembly is fetched and arranged on the circuit board 56 by utilizing an automatic jig via a vacuum adsorption or magnetic attraction, and the two connection points 57 are respectively aligned with the two conductive portions. The surface mounted process may be, but not limited to, a soldering mode. For example, in the surface mounted process, the circuit board 56 is sent to a tin stove (not shown), and the two connection points 57 respectively join with the two conductive portions, such that the motor magnetic pole assembly is electrically connected to the circuit board 56. However, the present invention is not limited to this embodiment. The motor magnetic pole assembly may be the motor magnetic pole assembly according to the present invention, that is, the motor magnetic pole assembly 90, or also the motor magnetic pole assembly 92.

When the three motor magnetic pole assemblies 90 are arranged on the same side of the circuit board 56, and the three motor magnetic pole assemblies 92 are arranged on the other side of the circuit board 56, the controller 562 may control the three motor magnetic pole assemblies 90 and the three motor magnetic pole assemblies 92, such that a rotation speed of the rotating element 60 may be divided into three stages. More particularly, when the controller 562 controls the single winding set 58 (that is, the single motor magnetic pole assembly 90 and the single motor magnetic pole assembly 92) to obtain a power source, the rotating element 60 rotates due to a repulsion force generated from magnetic forces generated by the single motor magnetic pole assembly 90 and the single motor magnetic pole assembly 92. When the controller 562 controls more winding sets 58 to obtain the power source, the rotation speed of the rotating element 60 is increased as the repulsion force is increased.

In addition, the controller 562 may control and utilize the two winding sets 58 to control the rotation speed of the rotating element 60 to be two stage rotation speeds, and the other winding set 58 may be a braking unit. More particularly, when the controller 562 senses that the rotation speed of the rotating element 60 is excessively high and the rotation speed of the rotating element 60 needs to be decelerated, the controller 562 may reverse a current required by a winding set 58, so as to neutralize a part of the magnetic forces generated by the other two winding sets 58, such that the rotation speed of the rotating element 60 is decelerated.

In addition to the braking unit, the winding set 58 may also be a power generating unit. For example, when the controller 562 utilizes the two winding sets 58 to enable that the rotating element 60 to have two stage rotation speeds, the controller 562 may control the other winding set 58 to be the power generating unit to output the electric power, such that the LED 621 arranged on the housing 62 emits lights, and a user may know that the DC brushless motor 50 is in operation. The above embodiments are not used to limit functions and applications of the motor magnetic pole assembly according to the present invention, and may be adjusted according to practical demands. The motor magnetic pole assembly according to the present invention may be a coil of a stator of a miniaturized motor.

In the motor magnetic pole assembly and the motor manufacturing method using the same according to the present invention, through the motor magnetic pole assembly having the base, mass automation production of the motor using the magnetic pole assembly according to the present invention may be realized. In the motor manufacturing method using the motor magnetic pole assembly, the motor magnetic pole assembly according to the present invention is fetched by utilizing the automatic jig via the vacuum adsorption or magnetic attraction and quickly and precisely arranged on the circuit board, and the motor magnetic pole assembly is then electrically connected to the circuit board through the surface mounted process, thereby reducing manpower resources and the manufacturing cost, so as to shorten a production time to increase a production capacity of a production line, stably join the motor magnetic pole assembly with the circuit board, and ensure joint quality of the motor magnetic pole assembly and the circuit board.

What is claimed is:

1. A motor magnetic pole assembly, comprising:
   a coil body, having a central shaft and two connection ends;
   a base, comprising a column and a first plate body having two grooves formed downward from an outer surface of the first plate body and spaced by a distance, wherein the coil body surrounds the column and the central shaft is in parallel with the column; and
   two conductive portions, respectively arranged on surfaces of the two grooves of the first plate body opposite to the column and spaced by a distance, wherein a width and a length of each of the second grooves are smaller than a width and a length of a corresponding conductive portion, and the connection ends are respectively electrically connected to the conductive portions.

2. The motor magnetic pole assembly according to claim 1, wherein the base further comprises a second plate body having a first groove, such that the first plate body, the column and the second plate body form an H shape.

3. The motor magnetic pole assembly according to claim 1, wherein the column is a cylinder, a square column, an elliptical cylinder or a triangular column.

4. The motor magnetic pole assembly according to claim 1, wherein the base further comprises a notch, arranged between the conductive portions and penetrating the first plate body and the column.

\* \* \* \* \*